United States Patent
Eckhoff et al.

(10) Patent No.: US 9,533,610 B2
(45) Date of Patent: Jan. 3, 2017

(54) SEAT FRAME OF A MOTOR VEHICLE SEAT WITH TWO SIDE PARTS AND A TRANSVERSE TUBE

(75) Inventors: Sascha Eckhoff, Leichlingen (DE); Joerg Woelfel, Remscheid (DE); Juergen Kill, Köln (DE)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 336 days.

(21) Appl. No.: 14/235,014

(22) PCT Filed: Jul. 6, 2012

(86) PCT No.: PCT/EP2012/063210
§ 371 (c)(1),
(2), (4) Date: Apr. 25, 2014

(87) PCT Pub. No.: WO2013/013955
PCT Pub. Date: Jan. 31, 2013

(65) Prior Publication Data
US 2014/0232163 A1 Aug. 21, 2014

(30) Foreign Application Priority Data
Jul. 26, 2011 (DE) .................. 10 2011 079 861

(51) Int. Cl.
*B60N 2/68* (2006.01)
*B60N 2/16* (2006.01)

(52) U.S. Cl.
CPC ............. *B60N 2/68* (2013.01); *B60N 2/161* (2013.01); *B60N 2/1615* (2013.01); *B60N 2/1675* (2013.01); *B60N 2/682* (2013.01)

(58) Field of Classification Search
CPC .......... B60N 2/68; B60N 2/682; B60N 2/161; B60N 2/1615; B60N 2/1675

USPC ..................................... 297/452.18
See application file for complete search history.

(56) References Cited

U.S. PATENT DOCUMENTS

| | | | | |
|---|---|---|---|---|
| 6,264,274 B1 * | 7/2001 | Frohnhaus | ........... | B60N 2/1615 297/313 |
| 6,957,796 B2 * | 10/2005 | Hensley | .................. | B60N 2/06 248/421 |
| 8,322,675 B2 * | 12/2012 | Ducreuzot | ........... | B60N 2/1615 248/424 |

FOREIGN PATENT DOCUMENTS

| | | |
|---|---|---|
| DE | 299 09 441 U1 | 8/1999 |
| JP | 2002-321551 A | 11/2002 |
| JP | 2009-040286 A | 2/2009 |

OTHER PUBLICATIONS

International Search Report mailed Oct. 8, 2012, as received in corresponding International Patent Application No. PCT/EP2012/063210.

* cited by examiner

*Primary Examiner* — Anthony D Barfield
(74) *Attorney, Agent, or Firm* — Foley & Lardner LLP

(57) ABSTRACT

The seat frame has a left and a right link, a left and a right side part and a transverse tube which connects the two side parts. The links are connected to the transverse tube for conjoint rotation. The transverse tube has a main tube located between the side parts, a left end piece assigned to the left side part and a right end piece assigned to the right side part. The main tube is connected to the two end pieces in respective overlapping regions. The main tube is manufactured from a material, preferably from steel, which has an at least 20% higher tensile strength than the material of the end pieces.

11 Claims, 3 Drawing Sheets

SEAT FRAME OF A MOTOR VEHICLE SEAT WITH TWO SIDE PARTS AND A TRANSVERSE TUBE

CROSS REFERENCE TO ELATED APPLICATIONS

Figure 1:
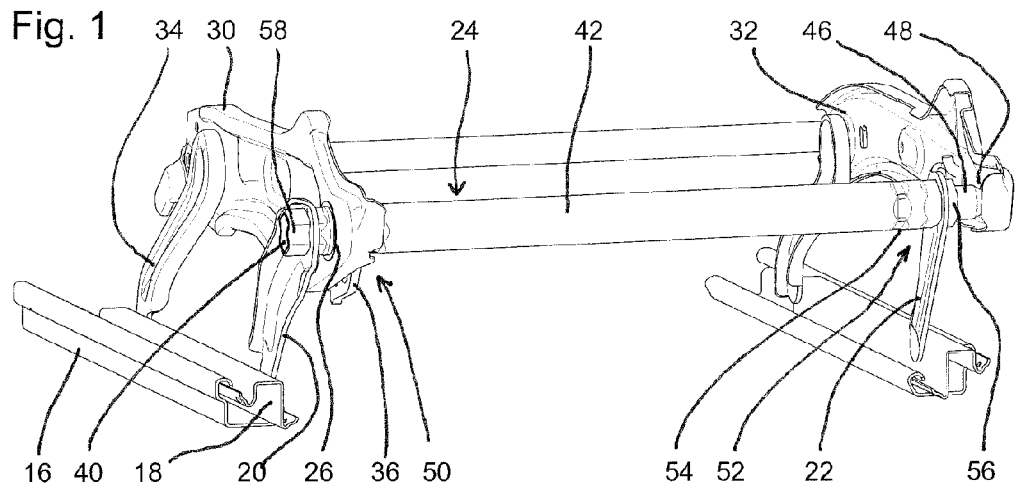

The present application is a U.S. National Stage of International Application No. PCT/EP2012/063210, filed Jul. 6, 2012, which claims the benefit of German Patent Application No. 10 2011 079 861.7, filed Jul. 26, 2011, the entire disclosures of all of which are incorporated herein by reference.

The invention relates to a seat frame of a motor vehicle seat with a left and a right rocker, with a left and a right side part, each of which has a bearing, and with a cross tube connecting the two side parts and having a left bearing region and a right bearing region, the left bearing region being supported in the left bearing and the right bearing region in the right bearing, and both rockers being non-rotatably connected to the cross tube.

Such a seat frame of a motor vehicle seat is known from U.S. Pat. No. 6,264,274 B1 by the applicant. The cross tube preferably is a rear cross tube connecting the two rear rockers of a motor vehicle seat. In an alternative, it is a front cross tube connecting front rockers with each other. The rockers of each seat side are each non-rotatably connected to the rotary tube. The rockers are pivotably mounted in the respective side part via the rotary tube. The rockers are hinged at their respective other ends with a seat rail of a pair of rails for longitudinal adjustment. For each seat side, a front rocker, the side part, a rear rocker and the seat rail usually form a joint parallelogram. This parallelogram is fixed via a locking member, e.g. via a toothed rocker connected to the cross tube and a pinion cooperating with this toothed rocker. Only one toothed rocker is preferably provided for both seat sides; only one seat side is locked via the toothed rocker; the other seat side is held by the cross tube; it has no locking device of its own.

The cross tubes have to satisfy predefined strength characteristics. In the case of a vehicle accident, particularly a crash, they also have to absorb the stresses that occur. A crash is understood to be an accident in which safety elements, such as airbags, are being triggered.

The cross tubes have to be able to transmit large torques. Large torques and torsional moments occur the region of the connection of the rockers to the cross tube. In the prior art, the cross tube is made of a correspondingly thick-walled and easily deformable tube material. However, this makes the cross tube relatively heavy. This contravenes the requirement of forming a motor vehicle seat with as low a weight as possible.

This is where the invention comes in. It has set itself the object of improving the seat frame of a motor vehicle seat of the type mentioned in the introduction in such a way that particularly the cross tube can be configured in a more light-weight manner. This is to be achieved while maintaining the strength that a cross tube according to the prior art has.

Based on the motor vehicle seat of the type mentioned in the introduction, this object is achieved by the cross tube being composed of a main tube located between the side parts, of a left end portion associated with the left side part and a right end portion associated with the right side part, by the main tube being connected to the left end portion in a left overlapping region 50, by the main tube being connected to the right end portion in a right overlapping region 52, and by the main tube being manufactured from a material, preferably steel, which has a tensile strength that is greater by at least 20% than the material of the end portions.

According to the invention, the transmission of the torques and torsional moments in the region of the connection to the rockers is achieved by using high-strength material in the main tube and by an additional reinforcement of the tube ends by an easily deformable tube material of the end portions. The end portions themselves can form the bearing regions and be located outside the main tube. However, they can also be inserted into the main tube at the ends; in that case, the main tube forms the bearing regions. Combined solutions are also possible.

Preferably, a steel with a high tensile strength, such as a tensile strength greater than 800 N/mm², is used for the main tube. Preferably, a dual-phase steel is used for the main tube. Preferably, the main tube and the respective end portion are connected to each other by means of deformation, particularly stamping. Additional welding is possible. Preferably, the end portions are made from a steel that has less than 80%, preferably less than 60% of the tensile strength of the main tube.

Preferably, each overlapping region has a narrow deformation region and a broad deformation region. The axial distance of these two deformation regions is different by at least 20%, preferably at least 30%, for both seat sides. Preferably, the narrow deformation region is situated at a greater distance from the adjacent tube end than the broad deformation region. Preferably, both deformation regions are non-round, e.g. hexagonal. Other polygons or non-round shapes are possible. The deformation preferably takes place by stamping.

Preferably, each end portion is shorter than 40% of the total length of the main tube. Preferably, the motor vehicle seat further comprises a torsion spring located within the cross tube. An end region of the cross tube, particularly an end portion of the cross tube, is preferably configured for accommodating a torsion spring. For this purpose, it has a retaining region enabling a positive accommodation of an end region of the torsion spring.

In the known manner, the torsion spring serves for lifting the associated pair of rockers and for compensating the weight of a passenger in this manner. Thus, the motor vehicle seat does not collapse when the lock of the locking member is released.

The main tube is connected to the end portions positively, non-positively or by substance-to-substance bond. Preferably, the free distance between the two end portions is greater than 20%, preferably greater than 30% of the axial length of the cross tube. Preferably, at least one bearing region of the cross tube is formed by the main tube.

Figure 2:
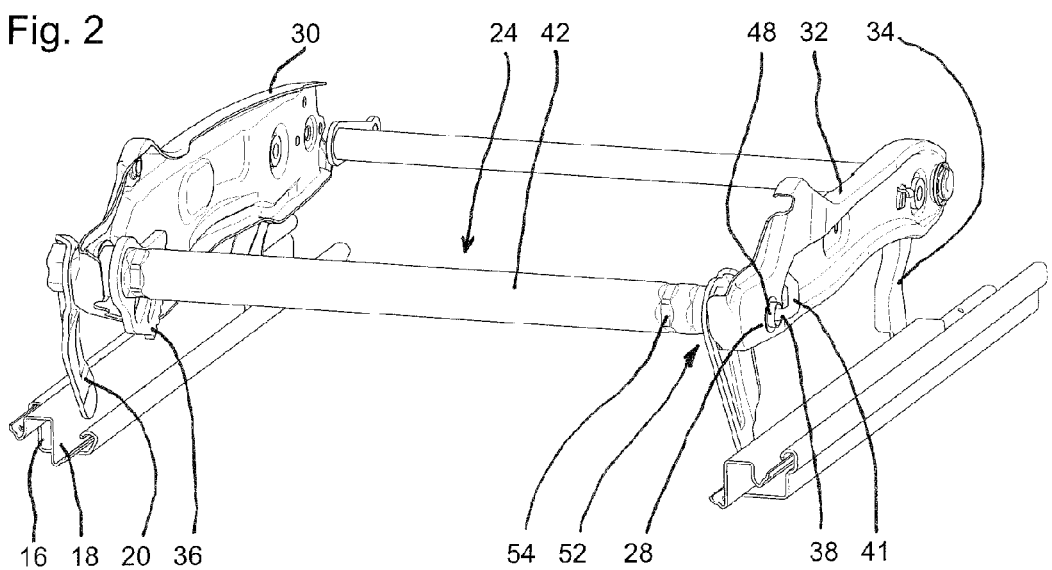
Figure 3:
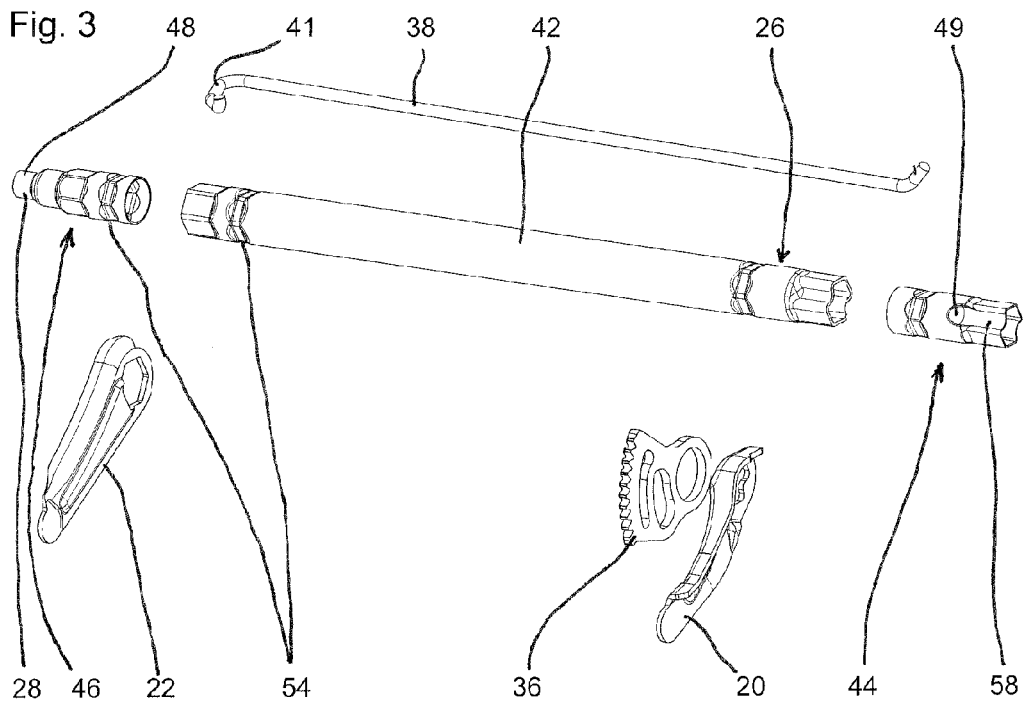
Figure 4:
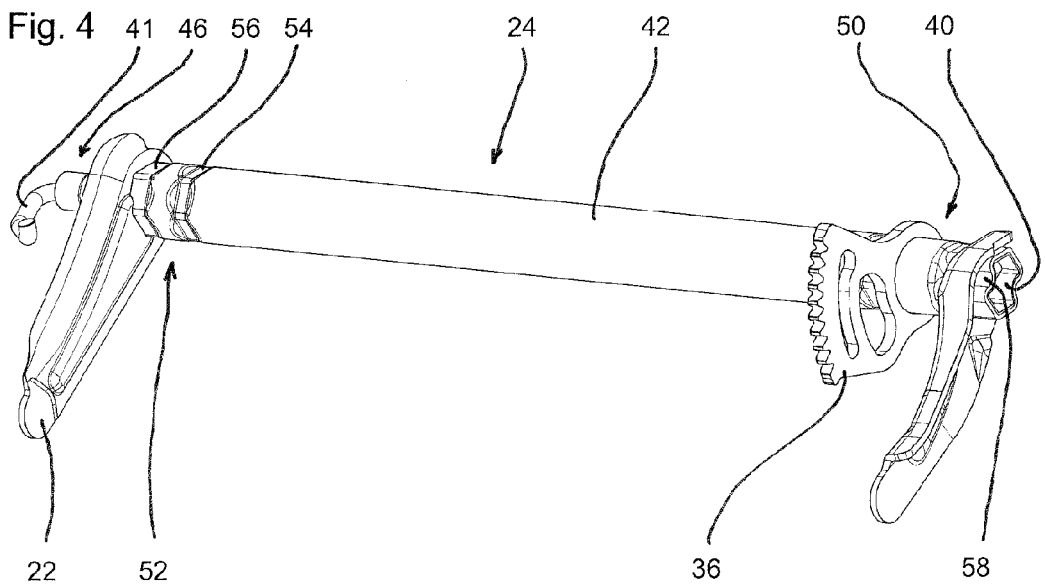
Figure 5:
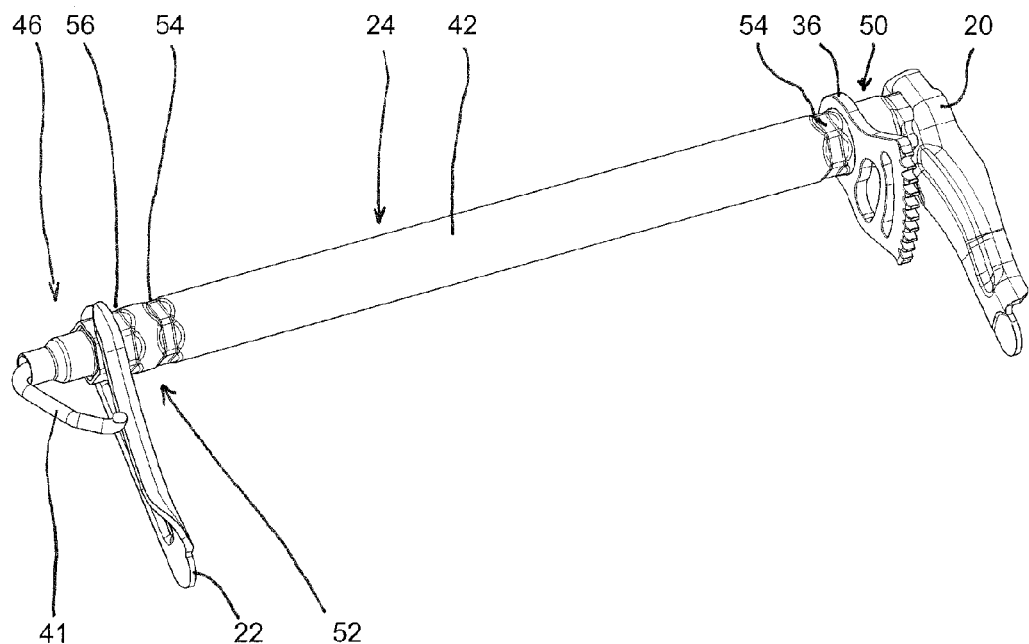
Figure 6:
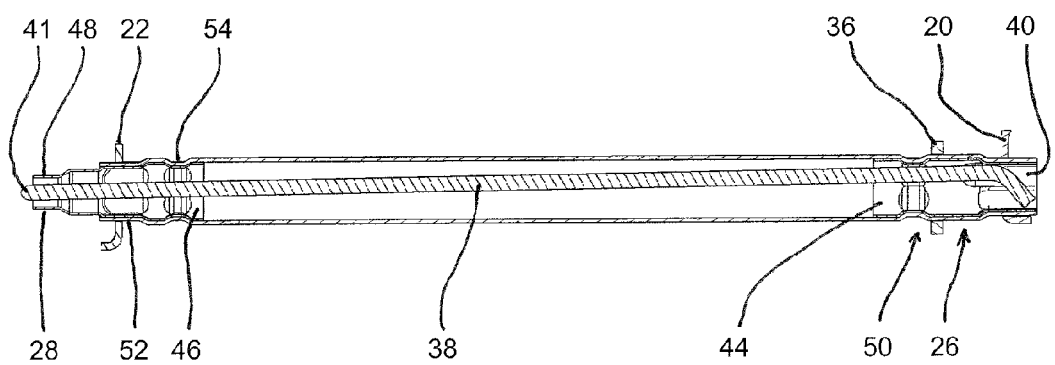

Other advantages and features of the invention become apparent from the other claims as well as from the following description of an exemplary embodiment of the invention, which shall be understood not to be limiting and which will be explained below with reference to the drawing. In the drawing:

FIG. 1: shows a perspective oblique view from the rear onto a seat frame of a motor vehicle seat, FIG. 2: shows a perspective oblique view from the rear onto the seat frame according to FIG. 1, a view from the rear, but now from a different oblique perspective, FIG. 3: shows a perspective oblique assembly view from the front of a cross tube with a torsion spring, a left and a right rocker and a toothed segment; the parts are in an already deformed state as it is provided after assembly, FIG. 4: shows a perspective oblique view from the front of the components shown in FIG. 3 joined to form a unit, FIG. 5: shows a perspective oblique view from the front as in FIG. 4, but with a different viewing direction, and FIG. 6: shows an axial cross section corresponding to a sectional plane defined by a longitudinal axis of the cross tube and the longitudinal extent of the two rockers.

The seat frame of a motor vehicle seat has a left pair of rails and a right pair of rails, each of which comprise a floor rail 16 and a seat rail 18. In the known manner, the floor rail 16 has fastening means (not shown) for attachment to a floor assembly of a motor vehicle (not shown). A left rocker 20 is connected to the left seat rail 18 in a joint; a right rocker 22 is connected to the right seat rail 18 in a joint. Both rockers 20, 22 are rigidly connected to a cross tube 24. In their longitudinal extent, the two rockers 20, 22 extend parallel to each other. The cross tube 24 has a left bearing region 26 and a right bearing region 28. The left bearing region 26 is grasped by a left side part 30. The right bearing region 28 is also grasped by a right side part 32. For this purpose, the two side parts 30, 32 each have a bearing.

The designation left and right is to be understood in relation to the x-y-z-coordinate system drawn into FIG. 1. Starting from the positive x-direction, which largely coincides with the normal direction of travel of a motor vehicle, the positive y-direction points to the left. In the specific exemplary embodiment, the left is the door side of the motor vehicle seat; the right is the tunnel side, or the side on which the other vehicle seat is provided in the motor vehicle. In FIGS. 1 and 2, the viewing direction points substantially in the positive x-direction. In contrast, the viewing direction in FIGS. 3-6 is substantially in the negative x-direction; therefore, the right and the left are different in those Figures from FIGS. 1 and 2.

One front rocker 34, respectively, is hinged to the side parts 30, 32. It has one lower joint region, respectively, and is hinged with it to the seat rail 18 in a lower joint region. A toothed rocker 36 is non-rotatably disposed on the cross tube 24. Via the cross tube 24, it is rigidly connected to the two rockers 20, 22.

A torsion spring 38 is provided; it is located substantially within the cross tube 24; it is non-rotatably fixed in a known manner on the door-side, left end region of the cross tube 24 in a retaining region 40 and protrudes axially from the cross tube at the tunnel-side, right end of the cross tube; there, the torsion spring has a hook region 41 supported on the right side part 32.

The seat frame described up to this point corresponds to the prior art.

In contrast to the prior art, the cross tube 24, the retaining region and the connection of the cross tube 24 are formed with the two rockers 20, 22 and with the toothed segment 36.

The cross tube 24 is composed substantially of three components, i.e. of a main tube 42, a left end portion 44 and a right end portion 46.

Before these parts are joined, the main tube 42 is a round tube section, which is welded or seamless. The tube section is manufactured from a high-strength steel material, for example a dual-phase steel, for example with a yield point greater than 800 N/mm$^2$. During its manufacture, a blank with a smaller diameter is produced from a raw tube, which originally has a larger diameter, by means of a deforming step, e.g. by a rolling process. A work hardening and significant increase in strength occurs due to the deformation. For example, the tube originally has a diameter of 22 mm and is reduced to 20 mm. The reduction is by 5 to 20% of the diameter.

Originally, the left end portion 44 is also a normal tube section of a round tube. The wall thickness is 30 to 70% of the wall thickness of the main tube 42. Prior to assembly, the left end portion 46 receives two approximately thumb-shaped embossings 49 that are 180° opposite from each other.

Originally, the right end portion 46 is also a normal tube section of a round tube. The wall thickness is 30 to 70% of the wall thickness of the main tube 42. The right end portion 46 is first deformed; on a free end, a cylinder region 48 with a significantly smaller diameter, for example 30 to 50% of the diameter of the raw tube piece, is formed. An intermediate region, which is also cylindrical, is produced during this deforming step. No attaching or bearing processes are carried out on it. The left end portion 44 and the right end portion 46 are approximately of the same length; the deviation is at most 25%, in particular at most 5%. The tube sections of the left end portion 44 and of the right end portion 46 have the same external diameter, which is adapted to the internal diameter of the main tube 42.

The three parts thus described are now assembled. In the process, the left end portion 44 is inserted flush into the left end of the main tube 42. Thus, it does not protrude over the left end of the main tube 42. A left overlapping region 50 is formed which has a length corresponding to the length of the left end portion 44. In contrast, the right end portion 46 is pushed into the right end region of the main tube 42 only to such an extent that the cylinder region 48 still protrudes freely. Thus, this end portion 46 protrudes from the main tube 42. A right overlapping region 52 is formed which has about 25 to 40% of the length of the right end portion 46.

The end portions 44, 46 fit into the main tube 42 with a small amount of play. The right end portion has a wall thickness which preferably corresponds to the wall thickness of the left end portion 44. The deviation can be ±20%. At least one of the two end portions 44, 46 has a wall thickness that is less than the wall thickness of the main tube 42. Preferably, the wall thickness of the two end portions 44, 46 is 50 to 80% of the wall thickness of the main tube 42.

The two end portions 44, 46 are manufactured from a steel grade having less strength than the material of the main tube 42. A deformable material is used which has a yield point that is smaller by at least 10%, preferably at least 25%, and in particular at least 40% than the material of the main tube 42.

The three components described above are now subjected to a deforming step. Here, a stamping process is preferably carried out. On the one hand, a peripheral narrow deformation 54 is carried out in both overlapping regions 50, 52. In the example, it is carried out as a stamped portion, and in the specific case, as a hexagonal stamped portion. The two narrow deformations 54 of the two sides match with regard to their configuration. A broad deformation 56 is located further outward. In the example, it is carried out as a stamped portion, and in the specific case, as a hexagonal stamped portion. The latter is different on the two sides of the cross tube 24. A hexagon is stamped on the right seat side. A hexagon with additional furrows 58, which are located above the thumb-shaped embossings 49, is stamped on the left side. The furrows 58 are 180° opposite from each other. The two narrow deformations 54 and the two broad deformations 56 are preferably carried out in a single step. Alternatively, they can also be carried out in several individual steps. The deformations respectively result in a deformation of the main tube 42 as well as of the end portion 44 or 46 concerned in each case.

The three components are positively interconnected by the above-described deforming steps. They can additionally be interconnected by substance-to-substance connection by a welding process, for example by laser welding.

The thumb-shaped embossing 49 in the left end portion 44 is longer by at least 5%, preferably by at least 10%, than the broad deformation 56 on the same side of the cross tube 24, and thus also than the furrow 58. Thus, it extends beyond the end of the hexagon and thus also beyond the furrow 58, as is apparent, in particular, from FIG. 3. The embossing 49 forms an internal bead which supports a bent leg 60 of the torsion spring 38. The fact that the embossing, seen from the end of the tube, extends further inside than the associated hexagon formed by the broad deformation 56 makes it possible to tighten the torsion spring 38 into a state in which it still has a bit of a distance with its other end region, which comprises the hook region 41, from the right side part 32, so that the hook region 41 can be twisted and the torsion spring 38 can be tightened. If it is in the tightened state, it is pushed into the cross tube 24; in the process, the leg 60 slides along the inner face of the embossing 49. The torsion spring 38 is pushed in so far until a free end of the hook region 41 reaches through an opening in the right side part 32 and protrudes inwards therefrom, as is apparent from FIG. 1, i.e. directly to the left of the line of the reference numeral 46.

The finished cross tube 24 is now connected to the other parts. The right rocker 22 with its hexagonal accommodating portion is pushed onto the broad deformation 56. The toothed segment is pushed onto the left end portion of the cross tube 24 and fixed in a position in which it is immediately adjacent to the region of the narrow deformation 54 there. A section of the left end region of the cross tube 24, which is located between the toothed rocker and the broad deformation region 56 of that side, forms the left bearing region 56. The left side part 30 is attached; the left bearing region 56 is accommodated in the process by a bearing in the left side part 30. Outside the left side part, the left rocker 20 is plugged onto the broad deformation 56; it has a cutout adapted to the cross section of this broad deformation 56; it is connected, in particular welded, to the area of the broad deformation 56. The cylinder region 48 forms the right bearing region 28; it is plugged into the right bearing located in the right side part 32.

As the FIGS. 1 and 2, in particular, show, one side part, in the specific case the left side part 30, is located between the two rockers 20, 22; the other side part, in this case the right side part 32, is located outside the two rockers 20, 22.

As is apparent particularly from FIG. 3, the distance between the narrow deformation 54 and the broad deformation 56 is greater on the left side than is the case on the right side. The difference is at least 50%, preferably at least 100%. Accordingly, the left overlapping region 50 is correspondingly longer than the right overlapping region 52. The difference is at least 10%, preferably at least 20%. The axial length of the left end portion 44 is approximately 18% of the length of the main tube 42. This dimension may deviate by ±50%. The axial length of the two end portions 44, 46 is approximately the same prior to assembly; this can deviate by ±20%.

The seat frame has a left and a right rocker 20, 22, a left and a right side part 30, 32, and a cross tube 24 connecting the two side parts 30, 32. The rockers 20, 22 are non-rotatably connected to the cross tube 24. The cross tube 24 has a main tube 42 located between the side parts 30, 32, a left end portion 44 associated with the left side part 30, and a right end portion 46 associated with the right side part 32. The main tube 42 is connected to both end portions 44, 46 in one overlapping region 50, 52, respectively. The main tube 42 is manufactured from a material, preferably steel, which has a tensile strength that is greater by at least 20% than the material of the end portions 44, 46.

The applicant reserves the right to combine any features and also sub-features from the description and/or the claims with one another, even if such a combination is not expressly described.

The invention claimed is:

1. A seat frame of a motor vehicle seat comprising:
   a left rocker and a right rocker;
   a left side part which has a left bearing and a right side part which has a right bearing; and
   a cross tube connecting the left and right side parts and having a left bearing region and a right bearing region, the left bearing region being supported in the left bearing and the right bearing region in the right bearing,
   wherein both the left and right rockers are non-rotatably connected to the cross tube,
   wherein the cross tube is composed of a main tube located between the left and right side parts, a left end portion associated with the left side part, and a right end portion associated with the right side part,
   wherein the main tube is connected to the left end portion in a left overlapping region, and the main tube is connected to the right end portion in a right overlapping region,
   wherein the main tube is manufactured from a material which has a tensile strength that is greater by at least 20% than the material of the left and right end portions,
   wherein at least one of the left and right rockers is located between the left side part and the right side part,
   wherein at least a first portion of the main tube is located between the left rocker and the left side part and/or at least a second portion of the main tube is located between the right rocker and the right side part.

2. The seat frame according to claim 1, wherein the left bearing region and the right bearing region are formed by the main tube and the main tube extends at least between the left bearing and the right bearing.

3. The seat frame according to claim 1, wherein the right and left end portions are each shorter than 30% of the total length of the main tube.

4. The seat frame according to claim 1, wherein the main tube has a tensile strength of at least 800 N/mm².

5. The seat frame according to claim 1, further comprising a torsion spring, wherein an accommodating portion for the torsion spring is formed in one of the left and right end portions.

6. The seat frame according to claim 1, wherein, in at least one of the left and right overlapping regions, a respective one of the left and right end portions is located within the main tube.

7. The seat frame according to claim 1, further comprising a toothed rocker that is non-rotatably disposed on the cross tube.

8. The seat frame according to claim 1, wherein at least one of the left and right overlapping regions comprises a peripheral narrow deformation and/or a broad deformation, wherein both the main tube and a respective one of the left and right end portions are deformed in the peripheral narrow deformation and/or the broad deformation.

9. The seat frame according to claim 1, wherein at least one of the left and right end portions comprises one of the left and right bearing regions.

10. The seat frame according to claim 1, wherein at least one of the left and right rockers is directly connected to the main tube.

11. The seat frame according to claim 1, wherein at least a portion of the left end portion is located between the left rocker and the left side part and/or at least a portion of the right end portion is located between the right rocker and the right side part.

* * * * *

UNITED STATES PATENT AND TRADEMARK OFFICE
CERTIFICATE OF CORRECTION

PATENT NO. : 9,533,610 B2  
APPLICATION NO. : 14/235014  
DATED : January 3, 2017  
INVENTOR(S) : Sascha Eckhoff et al.

Page 1 of 1

It is certified that error appears in the above-identified patent and that said Letters Patent is hereby corrected as shown below:

On the Title Page

Item (75) (Inventors), the name of the second inventor should read as:

Joerge-Max Woelfel

Signed and Sealed this
Fourth Day of April, 2017

Michelle K. Lee
*Director of the United States Patent and Trademark Office*